United States Patent Office 3,540,801
Patented Nov. 17, 1970

3,540,801
REFLECTOR FOR DIGITAL LIGHT DEFLECTORS
Uwe Schmidt, Pinneberg, Germany, assignor, by mesne assignments, to U.S. Philips Corporation, New York, N.Y., a corporation of Delaware
Filed Nov. 16, 1967, Ser. No. 683,576
Claims priority, application Germany, Nov. 22, 1966, P 40,841
Int. Cl. G02b 5/04
U.S. Cl. 350—286                  6 Claims

ABSTRACT OF THE DISCLOSURE

A ray reversal element including a tetrahedron and a medium in which the three reflecting surfaces of the tetrahedron are embedded, where the indices of refraction of the tetrahedron and medium are related such that there will be a total internal reflection of rays in the tetrahedron while the state of polarization of the rays is maintained constant.

---

Figure 1:
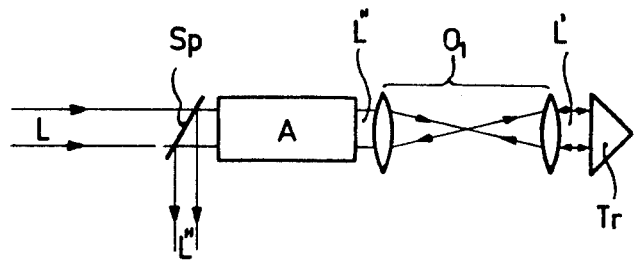

Methods have been proposed which enable symbols to be selected from a given number and to be displayed in an image plane by means of one or more known digital light deflectors. In order to reduce the required number of digital light deflectors, which may comprise Kerr cells controlled by means of pulses and interposed polarisers, a digital light deflector is used twice by means of ray reversal. The ray reversal is effected by means of a regular cube corner reflector. The light ray enters normally or substantially normally to the base of the cube corner reflector, is successively reflected at the three mutually perpendicular faces and leaves the tetrahedron by the base in a direction parallel or substantially parallel to the direction of incidence of the ray on the base. Since, if the light after passing twice through the light deflector is required to leave it in the stationary state, the reflected light must have the same state of polarization as before its entrance into the cube corner reflector, it is generally necessary to correct the phase of the reflected light. A possible method of effecting this is described in which a phase plate is interposed between the reflector and the digital light deflector.

The invention, which relates to a ray reversing element, for example a regular cube corner reflector, for digital light deflectors provides an alternative solution for the problem of the constant-phase reflection which is distinguished from the known solution by its greater simplicity. For this purpose, the invention is characterized in that the polarization state of the reflected light ray is maintained constant.

The point of departure for the solution of the problem is the question of the phase changes to which a light ray reflected by a regular cube corner reflector is subject. When the polarization state of the reflected light does not change, i.e. when two light rays polarized in directions at right angles to one another undergo the same treatment with respect to their phases and amplitudes, this is said to be an "eigenstate." For a light ray incident in a direction parallel to the axis of symmetry of the cube corner reflector such eigenstates have been computed and published in the literature. Of the eigenstates those for plane polarized light are of special interest in this connection. According to the abovementioned computations such eigenstates occur at the critical angle $\beta$ for total reflection when the angle of incidence on a reflecting face is equal to the critical angle $\beta$. In this case, with normal incidence the base, plane polarized light with an arbitrary azimuth is reflected by the tetrahedron as plane polarized light. Since with normal incidence on the base of a regular cube corner reflector the angle of incidence on the other faces has a fixed value, namely 54°7', the critical angle for total reflection must be equal to 54°7'. Hence the relation:

$$\sin 54°7' = \frac{n_u}{n_p} = 0{,}816 \quad (1)$$

must be satisfied, where $n_p$ is the index of refraction of the material of the tetrahedron and $n_u$ is the index of refraction of the surrounding medium. Since furthermore the direction of incidence of the light to be reflected varies within given limits, care must be taken to ensure that the actual angle of incidence on each of the three relevant faces of the cube corner reflector is greater than the critical angle $\beta$.

The invention is based on the idea of using the regular cube corner reflector as a retro-reflector, the angle of incidence of a laser beam for all of the reflecting faces of the reflector always being slightly greater than the critical angle for total reflection. Since owing to the small angular aperture this angle of incidence is only slightly changed in accordance with the setting of the above-mentioned light deflector, one may operate very close to the critical angle for total reflection.

The following consideration serves to determine those values of the respective indexes of refraction which satisfy this relation. For a ray L' incident in a direction parallel to the axis of symmetry of the cube corner reflector Tr (FIG. 1) the angle of incidence $\alpha$ is equal for all reflecting faces. In the operation of the light deflector A, which is traversed by the laser ray L and the ray L' reflected by the cube corner reflector and thus digitally deflects light rays in both directions, the deviations $\gamma/2$ from this angle of incidence $\gamma$ will be symmetrical with respect to the axis of the cube corner reflector Tr if this axis and the optic axis of the remainder of the system are parallel to one another. By reason of the law of reflection the deviations $\gamma/2$ will be equal for all three relevant phases of the cube corner reflector so that the following computation can be limited to the first active reflecting face. The reflected ray L" traversing the light deflector A is deflected, for example, by means of a partly transparent mirror Sp.

From the requirement that the laser ray must always be totally reflected at the three reflecting faces of the cube corner reflector, the following relation can be directly deduced:

$$\frac{n_u}{n_p} = \sin\left(-\frac{\gamma_0}{2} - \frac{\epsilon}{2} + 54°7'\right) \quad (2)$$

where $\gamma_0$=the range of variation of the angle of incidence and
$\epsilon$=the angle of divergence of the incident light ray.

This condition gives the maximum value for the ratio $n_u/n_p$, since the deviation from the eigenstate must be kept as small as possible.

In principle, this deviation may be maintained as small as required by making the diameter D of the incident light ray L', which is proportional to $$\frac{1}{\gamma + \epsilon}$$

correspondingly large, which can always be achieved by the choice of the dimensions of the optical lever $O_1$ (FIG. 1).

Figure 2:
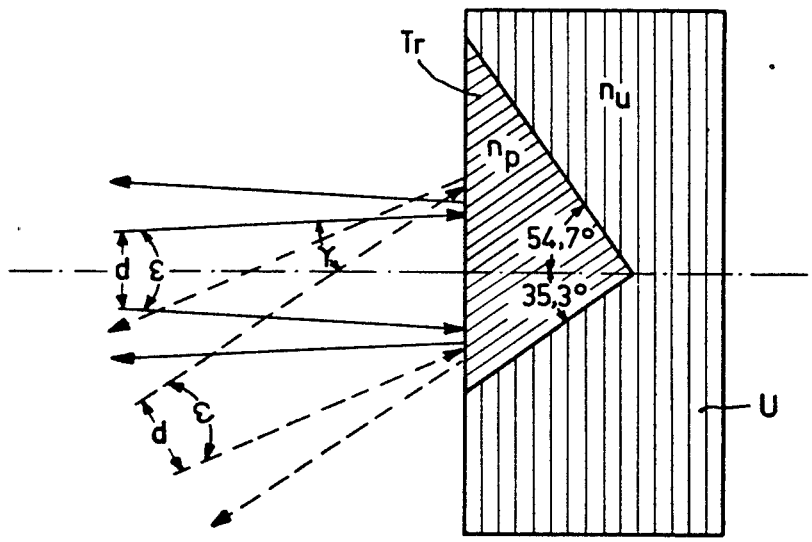

FIG. 2 shows an embodiment of the invention in which the reflector is a cube corner reflector Tr which is made of a material of refractive index $n_p$ and the reflecting faces of which adjoin a material U of refractive index $n_u$, the ratio $n_u/n_p$ satisfying the Equation 2. Let it be assumed for a practical case that a light beam, preferably a laser beam, having a wavelength $\lambda = 6328$ A. and a diameter D=3 cm., an angle of divergence limited by refraction, $$= 2\frac{\lambda}{\pi} d = 2.1 \times 10^{-5}$$

radians with a variation range of the angle of incidence $\gamma_0 = 2.1 \times 10^{-2}$, must be reflected by a regular cube corner reflector of dense flint glass having an index of refraction $n = 1.90884$. The Equation 2 then gives $$n_u + n_p \sin\left(-\frac{\gamma_0}{2} - \frac{\epsilon}{2} + 54°7'\right) = 1.90884$$

$$\times \sin\left(\frac{0.021}{2} - \frac{0.00021}{21} + 0.9553\right) = 1.9088$$

$$\times \sin(0.9448) = 1.9088 \times 0.81039 = 1.5470$$

The material U and kinds of glass having this index of refraction are known, for example, the commercially available light flint glass may have an index of refraction $n = 1.5463$. In principle, instead of the above-mentioned kind of glass any isotropic material, including synthetic materials or liquids, may be used provided that they satisfy the Equation 2.

What is claimed is:

1. A ray reversal element for use with a polarization-sensitive light deflector and a polarized ray, comprising a regular cube corner reflector having a base and three mutually perpendicular reflecting sides, and a medium in which the three reflecting sides are embedded, wherein the base of the reflector is aligned with and substantially perpendicular to rays passing through the deflector said medium and reflective material being non-gaseous and having refractive indices greater than one, the ratio of the indices of refraction of the medium and the reflector material being equal to or less than the sine of 54.7 degrees, whereby the ray passing through the base and striking one of the reflecting sides at an angle of approximately 54.7 degrees is totally reflected back to the deflector by the corner cube reflector without an alteration in the polarization state of the ray.

2. A system as defined in claim 1, for use with a laser beam, and including digital light deflector through which said beam is initially passed, a lens system disposed between the deflector and the ray reversal element, and a partially transparent mirror adjacent the deflector, whereby rays of said laser beam pass progressively through said deflector, the lens system, the ray reversal element, the lens system a second time, the deflector a second time, and finally are reflected off said mirror.

3. A ray reversal reflector as defined in claim 1 wherein the index of refraction of the element is greater than that of the medium.

4. A ray reversal element as defined in claim 3 wherein the critical angle for total reflection is 54°7' and the following equation is satisfied:

$$\sin 54°7' = \frac{n_u}{n_p} = 0.816$$

where $n_p$ and $n_u$ are the indices of refraction respectively of the tetrahedron and medium.

5. A ray reversal element as defined in claim 3, wherein the indices of refraction satisfy the equation:

$$\frac{n_u}{n_p} = \sin\left(-\frac{\gamma_0}{2} - \frac{\epsilon}{2} + 54°7'\right)$$

where $n_u$ and $n_p$ are the indices of refraction respectively of the tetrahedron and the medium, $\gamma_0$=the range of variation of the angle of incidence, and $\epsilon$=the angle of divergence of the incident light ray.

6. A ray reversal element as defined in claim 3 wherein the medium is an isotropic material.

References Cited

UNITED STATES PATENTS

| | | | |
|---|---|---|---|
| 2,872,675 | 2/1959 | Kennaugh | 350—102 |
| 3,072,011 | 1/1963 | Hemstreet. | |
| 3,391,970 | 7/1968 | Sincerbox | 88—1 |
| 2,346,247 | 4/1944 | Bailey et al. | 350—157 |

FOREIGN PATENTS

| | | |
|---|---|---|
| 743,502 | 1/1956 | England. |

DAVID SCHONBERG, Primary Examiner

M. J. TOKAR, Assistant Examiner

U.S. Cl. X.R.

350—102